3 Sheets—Sheet 3.
G. OLNEY.
MANUFACTURE OF GAS.
No. 172,474. Patented Jan. 18, 1876.
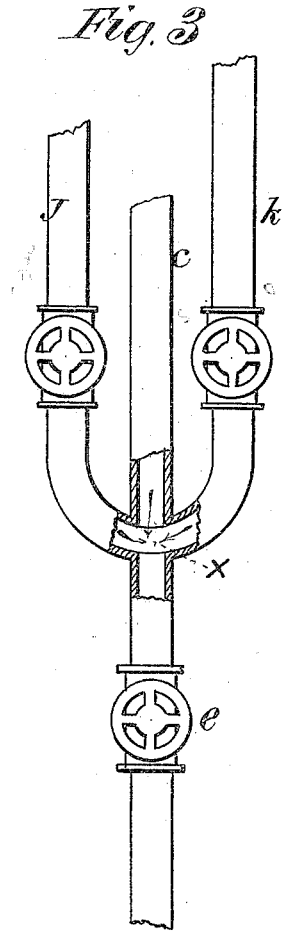
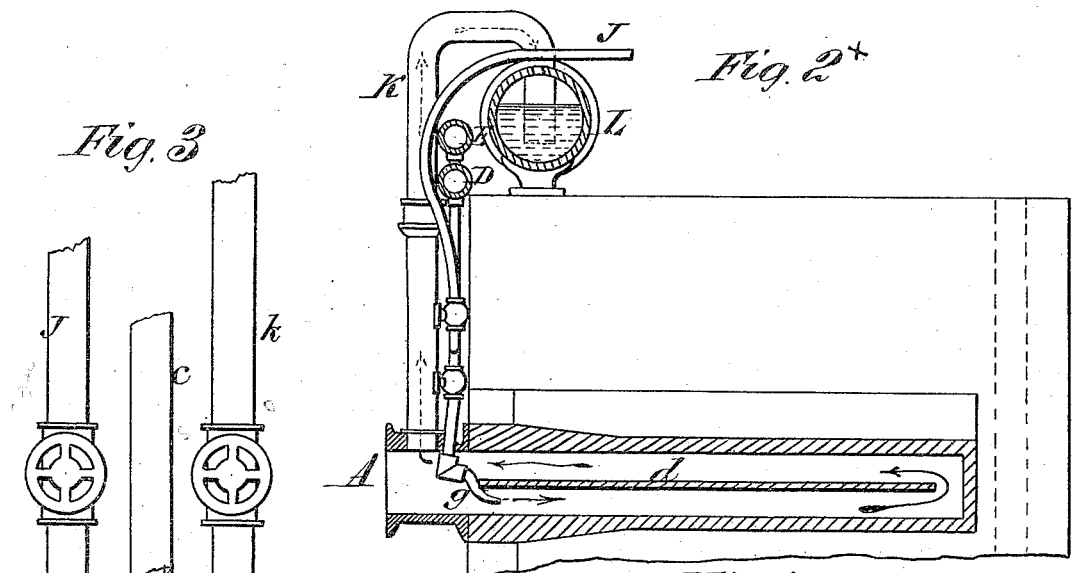
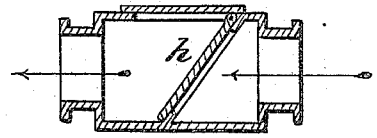
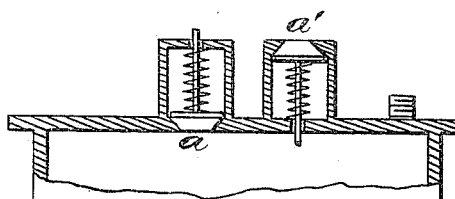
WITNESSES
E. H. Bates
Geo. E. Upshaw
INVENTOR
George Olney,
Chipman & ——
ATTORNEYS
N. PETERS, PHOTO-LITHOGRAPHER, WASHINGTON, D. C.

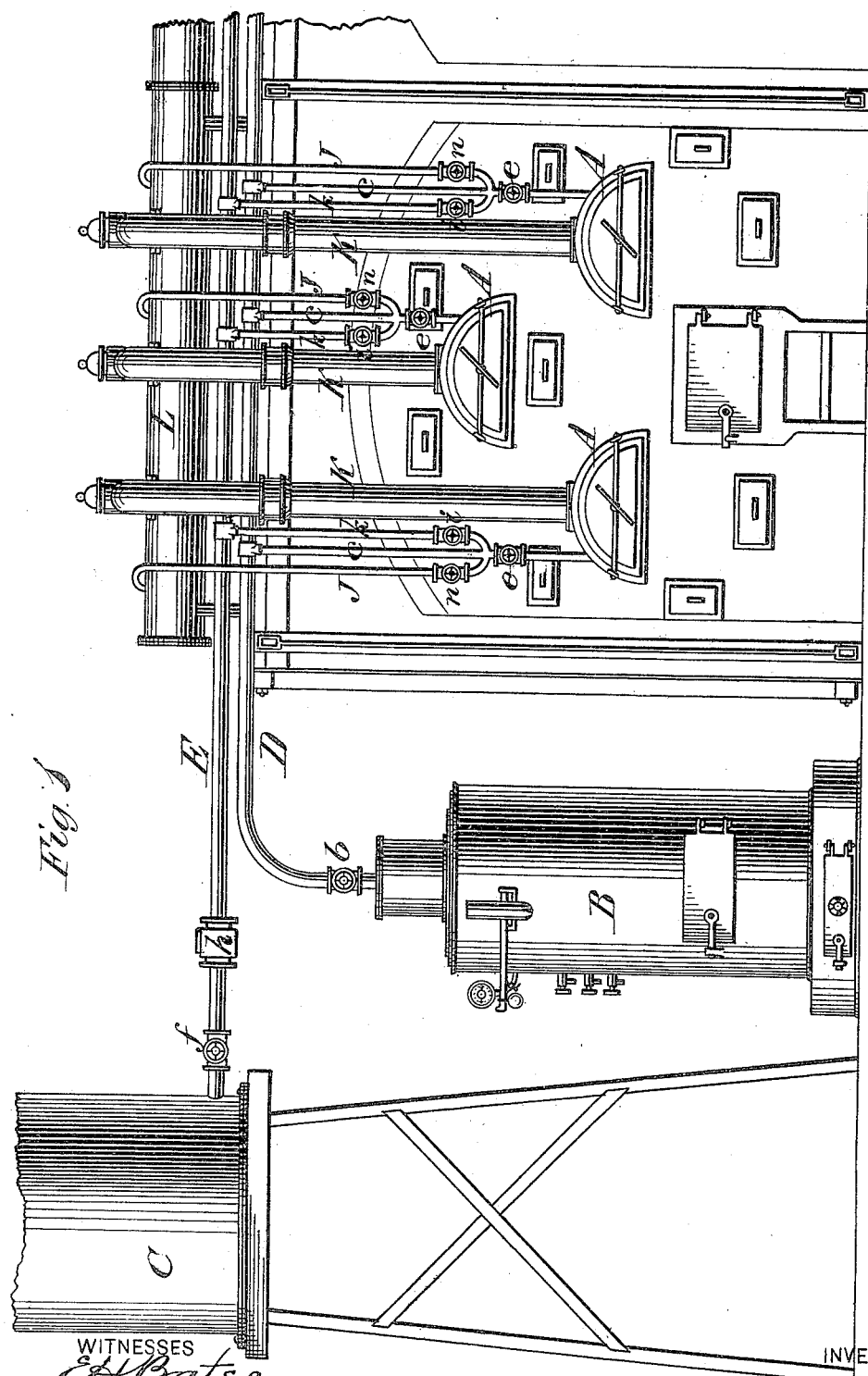

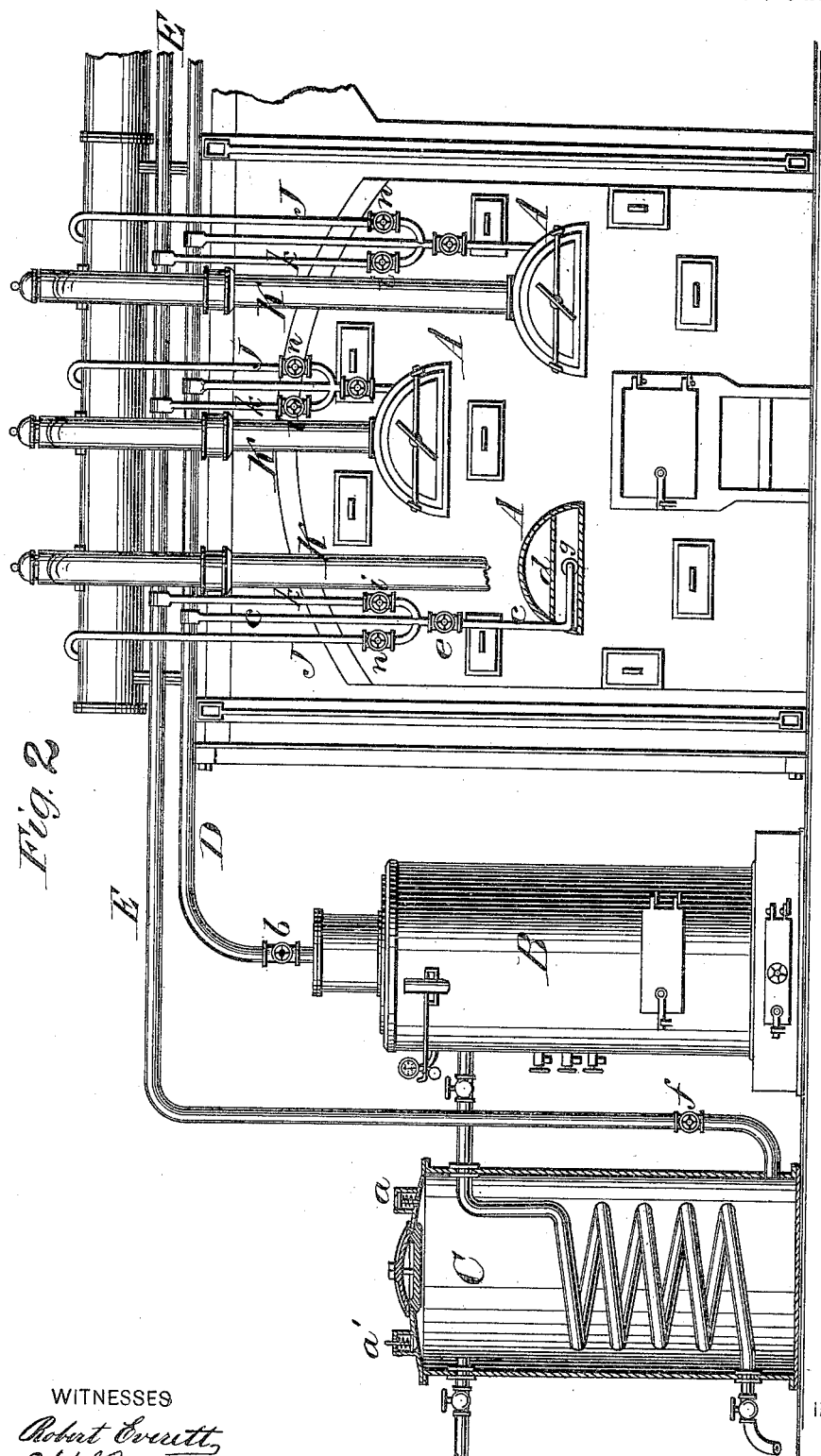

UNITED STATES PATENT OFFICE.

GEORGE OLNEY, OF BROOKLYN, NEW YORK.

IMPROVEMENT IN THE MANUFACTURE OF GAS.

Specification forming part of Letters Patent No. 172,474, dated January 18, 1876; application filed November 27, 1875.

*To all whom it may concern:*

Be it known that I, GEORGE OLNEY, of Brooklyn, in the county of Kings and State of New York, have invented a new and valuable Improvement in Apparatus for Manufacture of Gas; and I do hereby declare that the following is a full, clear, and exact description of the construction and operation of the same, reference being had to the annexed drawings, making a part of this specification, and to the letters and figures of reference marked thereon.

Figure 1 of the drawings is a representation of a front view of my apparatus, and Fig. 2 is a modification. Figs. $2^\times$, 3, 4, and 5 are sectional detail views of the same.

This invention has relation to the manufacture of gas for illuminating and other purposes; and the nature of my invention consists, mainly, in the combination, with coal-gas, of a hydrocarbon and steam, introduced in a spray or thin sheet into a heated retort, the said three bodies being intimately mixed just before they are injected into the retort, for the purpose of causing a more perfect chemical union of the different elements, and producing a uniform fixed gas, with little or no waste of material, as will be hereinafter more fully set forth.

In my experiments for the manufacture of a cheap and chemically-fixed gas for illuminating and heating purposes, I found that, when a hydrocarbon mixed with steam is injected into a highly-heated retort, the hydrogen set free from the steam does not readily combine with the coal-gas; but if common coal-gas, mixed previously with steam and a gas from a hydrocarbon, is injected into the retort, a chemical union of the gases will quickly take place, and a perfectly-fixed gas will result. This is evinced by the fact that a steady light is obtained, that no stratification of the gases in the pipes is found, and that the coal-gas produces a much larger volume when it is treated with the hydrocarbon fluid and steam.

In the annexed drawings, A A A designate a bank of retorts, which may be made in any suitable manner, and of any suitable material. The retort shown in Fig. $2^\times$ has a horizontal diaphragm in it; but this may be omitted, and coal used in the retort in its stead. B designates a steam-generator, and C designates a reservoir for containing a fluid hydrocarbon, which reservoir may be elevated, as shown in Fig. 1; but I prefer to have it on the ground, or beneath the surface thereof, when it will be out of the way. Two valves, $a$ $a'$, are applied to the top of the reservoir C. One prevents a vacuum being created therein, and the other allows the escape of air while filling the reservoir. (These valves are shown in Fig. 4.) D designates a steam-pipe, which is provided with a regulating-cock, $b$, and from which branch pipes $c$ are carried down into the front end of each one of the retorts A, terminating beneath the diaphragm $d$ therein in a flattened injecting-nozzle, $g$, which is directed toward the rear end of the retort. A regulating-cock, $e$, is applied to each branch pipe $c$, for a purpose hereinafter explained. E designates a pipe leading from the bottom of the oil-reservoir C, and provided with a regulating-cock, $f$, and also a valve, $h$, which latter prevents a flowing back of the oil into the reservoir after passing said valve. From the pipe E descend a number of branch pipes, $k$, which communicate with the branch pipes $c$ just above the cocks $e$, and which are provided with regulating-cocks $i$. J J J designate small pipes, which communicate with the pipes $c$ immediately opposite the lower termini of the oil-supply pipes $k$. These pipes J are provided with cocks $n$, and are designed for supplying coal-gas to the retorts A. They communicate with a gas-tank. K K K designate stand-pipes, which are water-sealed in the trunk L, and which communicate with the front ends of the retorts A, as shown in Fig. 2. These pipes $k$ carry off the gas for consumption.

When the retorts are properly heated steam from the boiler B is first admitted into them, which steam may, if desired, be previously superheated. This creates a current at the point X, Fig. 3. The oil-supply cocks are then opened, when the steam-current will instantly compel the oil to flow in properly-regulated quantities into the retorts through the nozzles $g$. The gas-cocks are then opened, and a supply of coal-gas is carried along into the retort.

It will now be seen that I effect a mixture of hydrocarbon fluid, steam, and coal-gas in the lower ends of the branch pipes $c$, and forcibly inject this mixture, in the form of spray, into the retort, where it instantly flashes into a chemically-fixed gas.

I have above referred to the use of fluid hydrocarbons; but by reference to figure it will be seen that the reservoir C is provided with a coil of pipe leading from the steam-generator B. I may thus use in reservoir C rosin, tallow, and other solid matters containing carbon. I therefore do not confine myself to the use of the light hydrocarbon fluids.

I am aware that an illuminating-gas made from heated carbureted gas and steam has heretofore been used.

What I claim as new is—

1. An improvement in the art of manufacturing illuminating-gas, consisting in injecting into a heated retort coal-gas and liquid or liquefied hydrocarbon by means of a steam-jet, substantially as described.

2. An improvement in the art of manufacturing illuminating-gas, which consists in the employment of coal-gas, hydrocarbon, and steam simultaneously, and intimately mixed together before they are injected into a retort, for the purpose of causing a more perfect chemical union of the parts, substantially as described.

In testimony that I claim the above I have hereunto subscribed my name in the presence of two witnesses.

GEORGE OLNEY.

Witnesses:
WALTER C. MASI,
D. D. KANE.